(No Model.)
J. WILSON.
APPARATUS FOR PURIFYING SEWAGE.
No. 482,053. Patented Sept. 6, 1892.
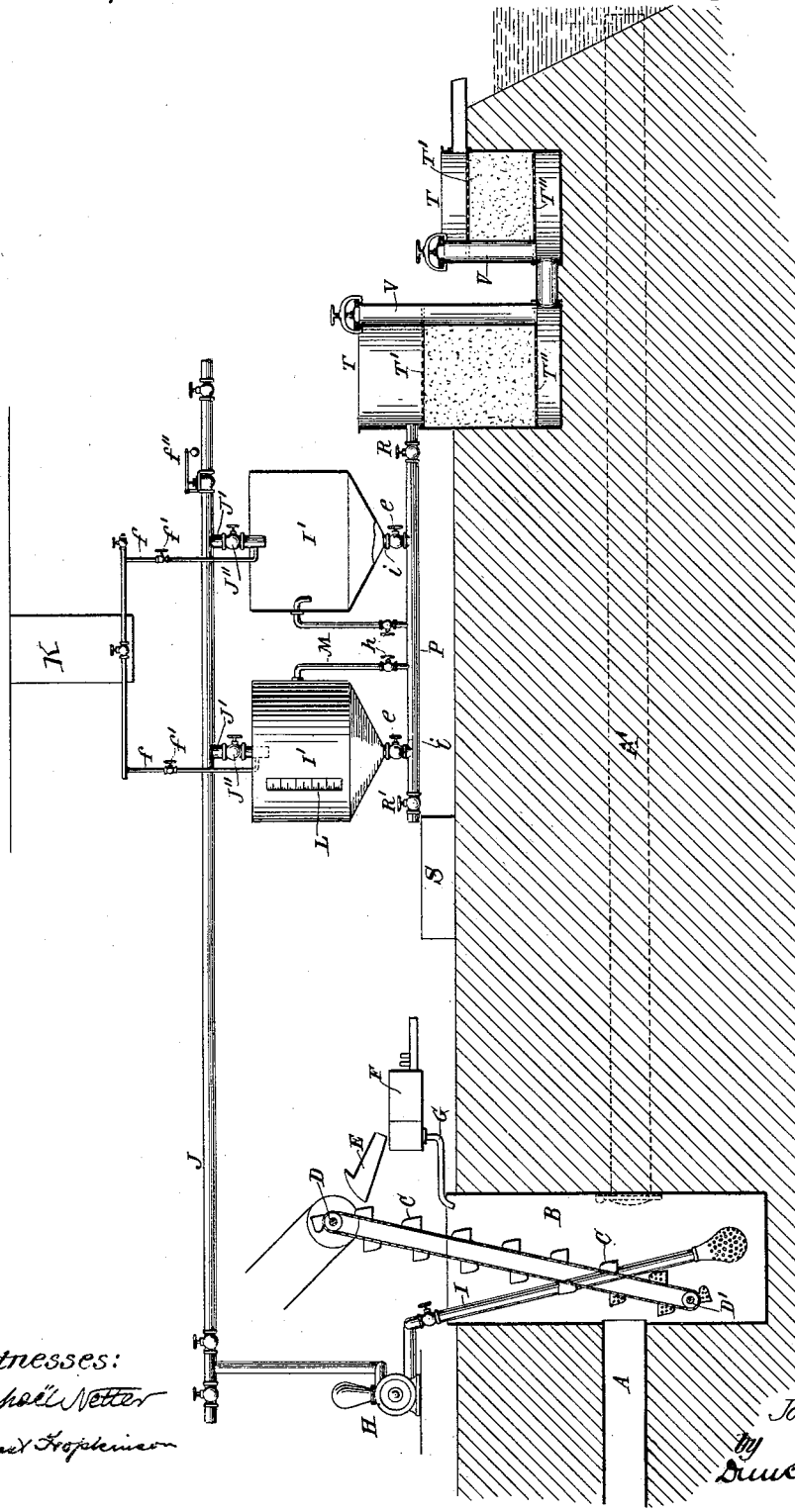
Witnesses:
Raphaël Netter
Ernest Hopkinson
Inventor
John Wilson
by
Duncan & Page.
Attorneys

UNITED STATES PATENT OFFICE.

JOHN WILSON, OF NEW YORK, N. Y., ASSIGNOR TO ROMAN DEBES, OF SAME PLACE.

APPARATUS FOR PURIFYING SEWAGE.

SPECIFICATION forming part of Letters Patent No. 482,053, dated September 6, 1892.

Application filed November 16, 1891. Serial No. 412,094. (No model.)

*To all whom it may concern:*

Be it known that I, JOHN WILSON, a citizen of the United States, residing at New York, in the county and State of New York, have invented certain new and useful Improvements in Apparatus for Purifying and Disposing of Sewage, of which the following is a specification, reference being had to the drawing accompanying and forming a part of the same.

My present invention is an improved apparatus for purifying and disposing of house-sewage or objectionable waste matter of other kinds, whereby the solid or useful portions may be separated out or recovered in condition to be utilized and the effluent discharged in a pure state.

The systems to which this invention relates are now extensively used in cities and towns having no suitable or convenient outlet or discharge for sewage or where precautions are observed not to pollute the streams or other bodies of water into which the sewers discharge.

The present improvements are designed for use with the systems of low-lying cities or towns, such as those located on low coasts and in which the main outlet or discharge of the sewers is below the level of the stream or other body of water into which the effluent finds its way, or in which the difference in level between the discharge-outlet and the stream is not sufficient for the employment of gravity disposal works for the treatment of the sewage.

The object of the apparatus which I have designed is, primarily, to separate out the solid matter which is held in suspension in the body of sewage as it is delivered from the mains and to filter and so far purify the effluent that it may be discharged into a stream without polluting the same or reduced to a condition in which it will not be objectionable or unwholesome. This is a matter which is ordinarily attended with considerable difficulty owing to the character of the sewage as it comes from the mains and the tendency of the solid matter to disintegrate.

According to my present invention I provide a tank or receptacle below the level of the main outlet, which in case the sewer be already laid is simply interposed therein as part of its path and the outlet closed. Within this pit I arrange a series of strainers carried by an endless belt of suitable construction, upon which the entire contents or outflow from the main is discharged at a suitable angle. By means of this device, which is kept always in motion, the main bulk of all matter held in suspension in the body of sewage is separated from the fluid portion thereof and delivered into a furnace, a press, or other equivalent device for its treatment or disposal, while the liquid portions are pumped up to the settling-tanks, filters, or like devices. Great economy is thus secured in the treatment of sewage and waste from the fact that the solid and liquid matters being separated at the very outset and without the employment of materials that unite with either, the mass as a whole are much more easily and readily manipulated.

In the accompanying drawing I have illustrated, mainly in vertical section, the apparatus for purifying and disposing of sewage that forms the subject of my present invention.

Reference is now made to the drawing in further illustration of the details of construction and operation.

A designates the main discharge of any sewer from which by reason of the topography of the place or for want of natural drainage or gravitation it becomes necessary to pump the sewage in order to treat it. If, as above stated, the sewer has already been laid, the pipe may be cut and a tank or pit B connected therewith. This tank may be of any suitable material or construction and may be provided with a valve in cases where it has an outlet A', so that the latter may be used, if necessary, to permit the direct discharge of sewage in the event of a derangement of the disposal works. In front of the opening of the main A and in position to receive the entire contents discharged therefrom is a combined strainer and conveyer of proper construction. I prefer to use for this purpose an endless series of scoops or buckets C, carried over a shaft D, driven by power, and an idle shaft D', located at or near the bottom of the tank. The buckets C are perforated or have perforated bottoms composed of wire-netting or fabric or other foraminous material, and as they ascend the fluid drains off from the solid matter, which is carried up and deposited as the buckets pass over the shaft D into a chute E, which delivers it to a press F of the kind usually employed for such purposes, which compresses the material into blocks suitable for burning after being dried or for other proper disposition. A pipe G carries off the surplus liquid expressed by the press and returns it to the tank B. A pump H, located within or above the tank B, draws up the liquid and material that has passed through the buckets or screens through a pipe I with an enlarged perforated end and delivers the same into a discharge-pipe J or any suitable receptacle with which it may be connected.

The further disposition of the impure fluid raised by the pump may be considerably varied. In some localities it would be unobjectionable to discharge the effluent directly from the tank or pump after the main portion of the solid matter had been separated by the screening buckets; but when it is necessary to still further purify it before final discharge I prefer to employ an apparatus designed by me especially for the purpose, but to which no special claim is made in this application except as to certain details in the construction of the filters.

This apparatus may be described as follows: The liquid forced into discharge-pipe J finds an outlet through branch pipes J', provided with cocks J''. These branches discharge into tanks I', the number of which will vary according to the capacity of the pump or to the average quantity of sewage to be disposed of. The bottom of each tank I' is contracted toward a central discharge opening or outlet $i$, controlled by a cock $e$. Small pipes $ff$, leading from a reservoir K for containing a coagulant or other suitable chemical, open into the branch pipes J', so that when any one or more of the pipes J' are discharging the liquid passing through them is intimately mixed with chemicals in proportions determined by the adjustment of cocks $f'$ in pipes $f$. A safety-valve $f''$ is connected with the discharge-pipe to relieve the same in case of undue strain from any stoppage or inability to carry off all the fluid raised by the pump.

Any number of the tanks I' may be in operation at the same time as may be desired. While in these tanks the liquid may be mixed with lime or earthy matter or a mixture of the same with or without other chemicals for deodorizing and disinfecting it, and it is then left for a proper time for settling.

The condition of the contents of the tanks I' is shown by glass gages L with which they are provided, and when the sludge has sufficiently settled the purer supernatant liquid may be run off by siphon-pipes M, containing cocks $h$, or by other suitable means and delivered into a pipe or conduit P. From this pipe the liquid is discharged into filtering-tanks, where it is further purified before its final discharge. After all the liquid is thus drawn off the cock R in pipes P is closed and the cock R' opened. The cocks $e$ in the discharges or outlets of the tanks I' are then opened and the sludge is run off into a tank S, where its moisture is evaporated off or where it is mixed with ashes, earth, or the like, or otherwise treated and disposed of.

The filtering-tanks T are of suitable size and material. They contain foraminous partitions T' at the top and T'' near the bottom, the space under the lower partition forming a water-chamber. The space between the partitions is filled with layers of salt, hay, with sand, charcoal, or some other filtering material between them, or any other proper material for the purpose may be used. The fluid passes downward through the first filter and upward through the next and is delivered at the top of the last at a lower level than the top of the first.

To provide for inspection and repair of the filters, I employ passages V, preferably oval in cross-section, built in the filters along and formed partly by the walls of the same. These passages I prefer to form of boiler-iron or suitable metal plates secured to the side walls of the filters and extending down into the water-chambers beneath the filtering material. They may be provided with covers, like other manholes.

A sewage-disposal works constructed as above described is very efficient and economical in its operation. One pump does all the work required in the movement of the fluid, and the conditions of treatment are such that the power to drive the pump and operate the conveyer and press may be derived from one source, while the products of combustion from the furnace may be passed through flues, that assist in drying the solid blocks from the press and evaporating the moisture from the sludge.

I do not claim, broadly, separating the solid and fluid portions of sewage, nor the processes herein involved in the respective treatments of the same, since that is made the subject of my application filed of even date herewith and bearing Serial No. 412,093; but

What I claim is—

1. In apparatus for purifying and disposing of sewage, the combination, with a sewer-main and a tank or pit into which such main opens, of a support carrying a series of traveling perforated screening-buckets for receiving the contents from the main, a press for receiving the solid matter from the buckets and provided with a pipe leading back to the pit, a delivery-chute between the buckets and press, a pipe leading to the bottom of the pit and provided with an enlarged lower end, and a pump connected to the upper end of said pipe, substantially as shown, and for the purpose set forth.

2. In apparatus for purifying and disposing of sewage, the combination, with a sewer-main and a tank or pit into which said main opens, of a support carrying a series of traveling perforated screening-buckets for receiving the contents from the main and elevating such contents to the top of the pit, a delivery-chute, a press receiving the material from said chute, a pipe leading to the bottom of the pit, two or more separate settling-tanks, and pipe connections between said settling-tanks and pumps and provided with suitable cocks and valves, substantially as and for the purpose described.

3. In apparatus for purifying and disposing of sewage of the character described, the combination, with the elevator, press, and pump, of the discharge-pipe leading from said pump, the settling-tanks, and the branch pipes connecting said discharge-pipe with said tanks, the reservoir, and the pipes leading from said reservoir and communicating with the branch pipes, each of the pipes named being provided with suitable cocks or valves, substantially as shown, and for the purpose set forth.

4. In apparatus for purifying and disposing of sewage, the combination, with the settling-tanks, of the pipe or conduit communicating therewith at the bottom and provided with suitable cocks or valves, the sludge-tank S, the siphon-pipes connecting said tanks with the conduit and controlled by cocks, and a suitable filter apparatus, substantially as described.

JOHN WILSON.

Witnesses:
ROBT. F. GAYLORD,
MARCELLA G. TRACY.